(12) United States Patent
Wang et al.

(10) Patent No.: US 12,237,705 B2
(45) Date of Patent: Feb. 25, 2025

(54) MULTI-PURPOSE MOBILE POWER SUPPLY AND ASSEMBLY OF MULTI-PURPOSE MOBILE POWER SUPPLY AND ELECTRIC TOOL

(71) Applicant: ZHEJIANG LERA NEW ENERGY POWER TECHNOLOGY CO., LTD., Ningbo (CN)

(72) Inventors: Hongbo Wang, Ningbo (CN); Jianhong Dai, Ningbo (CN); Hengzhao Ke, Ningbo (CN); Naiqian Xu, Ningbo (CN)

(73) Assignee: ZHEJIANG LERA NEW ENERGY POWER TECHNOLOGY CO., LTD., Ningbo (CN)

( * ) Notice: Subject to any disclaimer, the term of this patent is extended or adjusted under 35 U.S.C. 154(b) by 511 days.

(21) Appl. No.: 17/687,561

(22) Filed: Mar. 4, 2022

(65) Prior Publication Data

US 2022/0190616 A1 Jun. 16, 2022

Related U.S. Application Data

(63) Continuation of application No. PCT/CN2020/118682, filed on Sep. 29, 2020.

(30) Foreign Application Priority Data

Oct. 11, 2019 (CN) .......................... 201921698252.0
Oct. 11, 2019 (CN) .......................... 201921698254.X
(Continued)

(51) Int. Cl.
*H02J 7/00* (2006.01)
*H01M 10/42* (2006.01)

(52) U.S. Cl.
CPC .......... *H02J 7/0063* (2013.01); *H01M 10/425* (2013.01); *H02J 7/0044* (2013.01); *H01M 2010/4271* (2013.01)

(58) Field of Classification Search
CPC .... H02J 7/0063; H02J 7/0044; H01M 10/425; H01M 10/46; H01M 2010/4271
(Continued)

(56) References Cited

U.S. PATENT DOCUMENTS

2016/0226278 A1* 8/2016 Wenger .................... B25F 5/00
2018/0102654 A1 4/2018 Miller et al.
2018/0277804 A1* 9/2018 Lee ..................... H02J 7/00036

FOREIGN PATENT DOCUMENTS

CN 103094958 A 5/2013
CN 104184179 A 12/2014
(Continued)

*Primary Examiner* — Nathaniel R Pelton
(74) *Attorney, Agent, or Firm* — Bayramoglu Law Offices LLC

(57) ABSTRACT

A multi-purpose mobile power supply includes a first discharge interface configured for powering a computer, communication and consumer electronic product; a second discharge interface configured for powering an electric tool; and an assembly of the mobile power supply and the electric tool. The electric tool includes: an motor; a mounting portion configured for a freely assembling and disassembling connection with the multi-purpose mobile power supply; a power supply terminal provided on the mounting portion and electrically connected to the motor, where the power supply terminal is configured for being combined with the second discharge interface; a latch arranged on the mounting portion, where the multi-purpose mobile power supply is provided with a latch groove corresponding to the latch, and the latch is fitted in the latch groove in a latching connection.

19 Claims, 12 Drawing Sheets

(30) Foreign Application Priority Data

Oct. 11, 2019 (CN) .......................... 201921698268.1
Oct. 11, 2019 (CN) .......................... 201921698370.1

(58) Field of Classification Search
USPC ................................................ 320/112, 135
See application file for complete search history.

(56) References Cited

FOREIGN PATENT DOCUMENTS

| | | |
|---|---|---|
| CN | 107492920 A | 12/2017 |
| CN | 108536267 A | 9/2018 |
| CN | 208127917 U | 11/2018 |
| CN | 111049209 A | 4/2020 |
| CN | 210724240 U | 6/2020 |
| CN | 210724241 U | 6/2020 |
| CN | 211296216 U | 8/2020 |
| CN | 211456715 U | 9/2020 |

* cited by examiner

MULTI-PURPOSE MOBILE POWER SUPPLY AND ASSEMBLY OF MULTI-PURPOSE MOBILE POWER SUPPLY AND ELECTRIC TOOL

CROSS REFERENCE TO THE RELATED APPLICATIONS

This application is a continuation application of International Application No. PCT/CN2020/118682, filed on Sep. 29, 2020, which is based upon and claims priority to Chinese Patent Application No. 201921698252.0, filed on Oct. 11, 2019, Chinese Patent Application No. 201921698254.X, filed on Oct. 11, 2019, Chinese Patent Application No. 201921698268.1, filed on Oct. 11, 2019, Chinese Patent Application No. 201921698370.1, filed on Oct. 11, 2019, the entire contents of which are incorporated herein by reference.

TECHNICAL FIELD

The present invention relates to a multi-purpose mobile power supply, and an assembly based on the multi-purpose mobile power supply and an electric tool.

BACKGROUND

The mobile power supply is composed of multiple batteries with high energy density and has a high overall capacity. Specifically, a charge interface and one or more discharge interfaces are arranged on a housing, which can be configured for repeated charging and discharging. The charge interface can be connected to a power socket through a USB data cable and a common charging stand to charge the mobile power supply. The discharge interface can be connected to a portable electronic device through the USB data cable for power supply. Through the USB data cable of different interface forms, the mobile power supply realizes charging various portable electronic devices. Moreover, a lightweight shape and a portable feature make the mobile power supply be used frequently in daily lives. However, the charge and discharge interfaces and functions of the prior mobile power supply are relatively single, and most of them are only configured for powering computer, communication and consumer (3C) electronic products.

SUMMARY

An objective of the present invention is to provide a multi-purpose mobile power supply that guarantees the powering safety.

The present invention provides a multi-purpose mobile power supply, including:
a first discharge interface configured for powering a 3C electronic product; and
a second discharge interface configured for powering an electric tool.

When the second discharge interface is installed and connected to a corresponding interface of the electric tool, the first discharge interface is at least partially covered by the electric tool.

Further, the first discharge interface and the second discharge interface are arranged on the same surface of the multi-purpose mobile power supply.

Further, the first discharge interface is arranged on a first side surface of the mobile power supply, and the second discharge interface is arranged on a second side surface adjacent to the first side surface.

The electric tool is configured with a mounting portion corresponding to the second discharge interface, and the mounting portion is correspondingly provided with a connecting surface opposite to the second discharge interface, and a mounting side surface configured for at least partially covering the first discharge interface.

Further, there is no significant height difference on any surface of the mobile power supply.

The advantages of the present invention are as follows.

The mobile power supply is configured for powering the 3C electronic products, and can be configured for powering the electric tools. Since powering the electric tools is generally in a complex environment, such as powering electric chain saws, where users should avoid using the mobile power supply for simultaneously powering the electric tools and the 3C electronic products, especially mobile phone and other communication equipment, which are often connected by data cables during powering. In this case, it is liable to cause operation accidents and cause unsafe use of the mobile power supply. Therefore, when the second discharge interface is installed and connected to the corresponding interface of the electric tool, the first discharge interface is at least partially covered by the electric tool, so that the first discharge interface for powering the 3C electronic products cannot be used normally, which effectively eliminates the operation situation of simultaneously powering the electric tools and the 3C electronic products by the mobile power supply, ensuring the safety of users.

Another objective of the present invention is to provide a multi-purpose mobile power supply that is easy to operate and use.

The present invention provides a multi-purpose mobile power supply, including a bottom surface, a top surface, two opposite first side surfaces extending along a length direction of the mobile power supply, and two opposite second side surfaces extending along a width direction, further including:
a first discharge interface configured for powering a 3C electronic product; and
a second discharge interface arranged on any one of the second side surfaces.

The second discharge interface at least includes a first terminal, and the first terminal is configured for press-fitting with a corresponding terminal of an electric tool along the length direction.

Further, the mobile power supply is configured for a direct assembling and disassembling connection with the electric tool, and at least one surface of the mobile power supply is in a latching connection with a corresponding surface of the electric tool.

Further, a surface of the mobile power supply adapted to the electric tool for the latching connection is as basically flat as a surface of a housing body of the mobile power supply.

The advantages of the present invention are as follows.

The mobile power supply can meet powering the 3C products, and adapt to the electric tools for powering, and the structure layout is reasonable. When the users operate and use, the users can hold the mobile power supply in the width direction and insert it along the length direction. Since the distance of the width direction is short, the users can conveniently hold, use and operate.

Another objective of the present invention is to provide a multi-purpose mobile power supply that can be adapted to the use of the electric tools, has a simple structure, and is convenient to carry.

The present invention provides a multi-purpose mobile power supply, including:

a first discharge interface configured for powering a 3C electronic product;

a second discharge interface configured for powering an electric tool; and at least one latch groove arranged on a surface of a housing body of the mobile power supply and configured for a latching connection with the electric tool.

The surface of the housing body where the latch groove is arranged or a surface adjacent thereto has no protrusion.

The advantages of the present invention are as follows.

The mobile power supply can meet powering the 3C products, and adapt to the electric tools for powering, and the structure layout is reasonable. When the surface of the housing body of the mobile power supply is arranged with the latch groove, the traditional battery pack used in matching electric tools generally has the protuberant latch, and the unlocking mechanism linked with the latch for user operation, causing the battery pack to have a complex structure layout and a large structure size, and be inconvenient to carry and use as a mobile power supply. Therefore, in the mobile power supply provided by the present invention, a conventional latch is set as a latch groove, and the traditional unlocking mechanism is omitted, so that the surface of the housing body where the latch groove is arranged or the surface adjacent thereto has no protrusion.

Another objective of the present invention is to provide a multi-purpose mobile power supply that has the bidirectional charging and discharging function, and directly adapts to the electric tools for powering.

The present invention provides a multi-purpose mobile power supply, including:

a bidirectional charging and discharging interface, where the bidirectional charging and discharging interface is configured for charging or discharging the 3C electronic product, and is connected to a built-in bidirectional charging and discharging circuit of the mobile power supply; and a second discharge interface, where the second discharge interface is configured for powering an electric tool, and includes a first terminal, and the first terminal is configured for press-fitting with a corresponding terminal of the electric tool.

When the first terminal is press-fitted with the corresponding terminal of the electric tool, a surface of the mobile power supply is in contact with the electric tool, and at least one surface is in a latching connection with the corresponding surface of the electric tool.

Further, the bidirectional charging and discharging interface is configured for automatically recognizing whether the external device is a charging power supply or a device that needs to be charged, and automatically switching a charging or discharging state.

The advantages of the present invention are as follows.

On one hand, the mobile power supply is equipped with a bidirectional charging and discharging interface, which is configured to supply power to the 3C electronic products, and can charge itself through the 3C electronic products to facilitate the use of the mobile power supply. On the other hand, it is equipped with the discharge interface adapted to the electric tools. Through the discharge interface, powering the electric tools can be met, which overcomes the phenomenon that the charging and discharging interface and the function of the traditional mobile power supply are single, and the mobile power supply can also be in a direct latching connection with the electric tools to directly meet powering the electric tool, and make the operation and use be simple and convenient. Therefore, the mobile power supply connects the powering of the electric tools with the powering of the 3C electronic products, achieving the powering in two different fields across borders.

In addition, the present invention further provides an assembly of a multi-purpose mobile power supply and an electric tool, including:

the multi-purpose mobile power supply as described above; and the electric tool, including:

a motor;

a mounting portion configured for a freely assembling and disassembling connection with the multi-purpose mobile power supply;

a power supply terminal, where the power supply terminal is arranged on the mounting portion and is electrically connected to the motor, and the power supply terminal is configured for being combined with the second discharge interface;

a latch arranged on the mounting portion, where the multi-purpose mobile power supply is provided with a latch groove corresponding to the latch, and the latch is fitted in the latch groove in a latching connection; and at least one unlocking mechanism configured to manually disengage the latch from the latch groove.

Compared with the prior art, the assembly of the multi-purpose mobile power supply and the electric tool has all the advantages of the above-mentioned multi-purpose mobile power supply, and will not be illustrated in detail.

BRIEF DESCRIPTION OF THE DRAWINGS

In order to more clearly illustrate the specific embodiments of the present invention or the technical solutions in the prior art, a brief introduction of the drawings that need to be used in the description of the specific embodiments or the prior art is as follows. The drawings in the following description are some embodiments of the present invention. For those ordinary skilled in the art, without creative work, other drawings can be obtained based on these drawings.

DETAILED DESCRIPTION OF THE EMBODIMENTS

The technical solutions of the present invention will be clearly and completely described below in conjunction with the drawings. The described embodiments are part of the embodiments of the present invention, and not all of the embodiments. Based on the embodiments of the present invention, all other embodiments obtained by the ordinary skilled in the art without creative work shall fall within the protection scope of the present invention.

Embodiment 1

Figure 1:
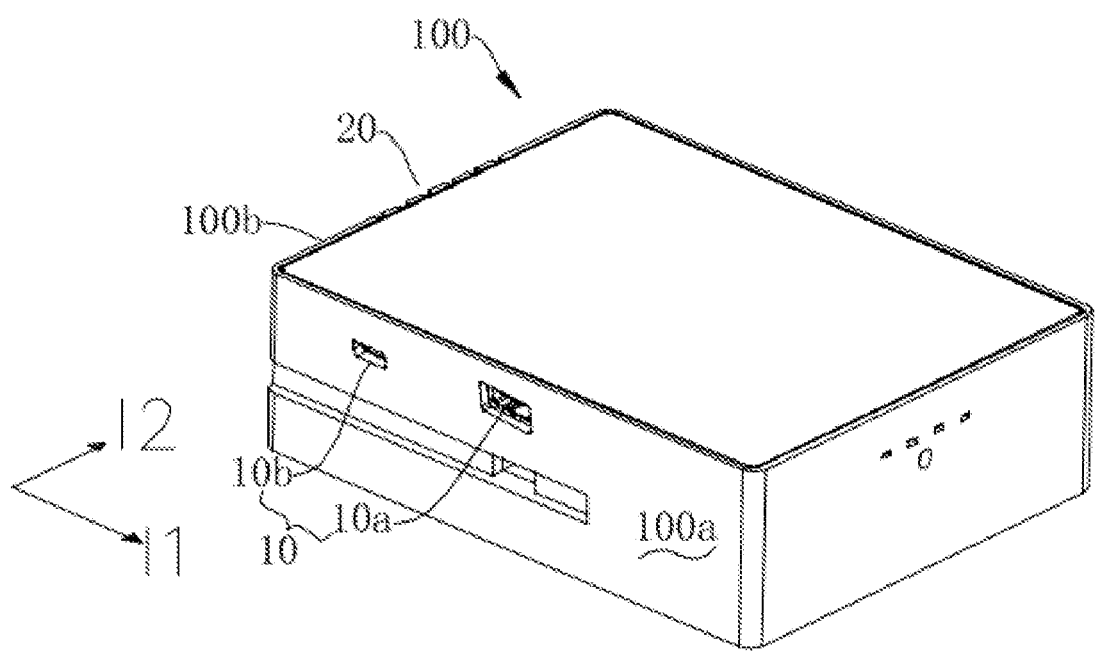
FIG. 1: A structural schematic diagram of Embodiment 1 of the present invention.
Figure 2:
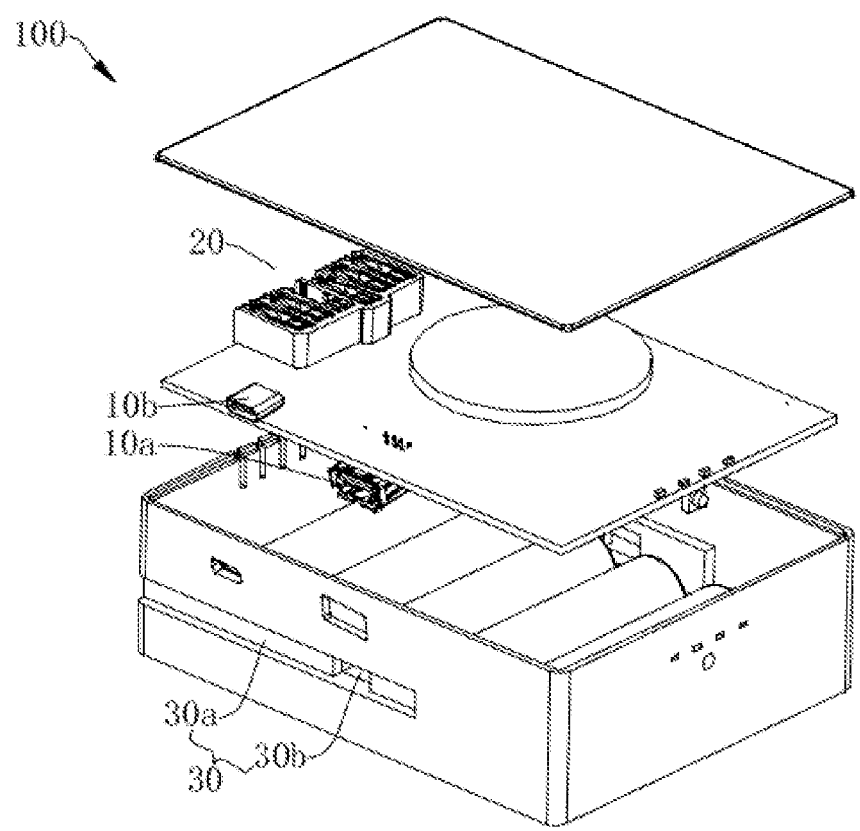
FIG. 2: An exploded schematic diagram of FIG. 1 of Embodiment 1 of the present invention.
Figure 3:
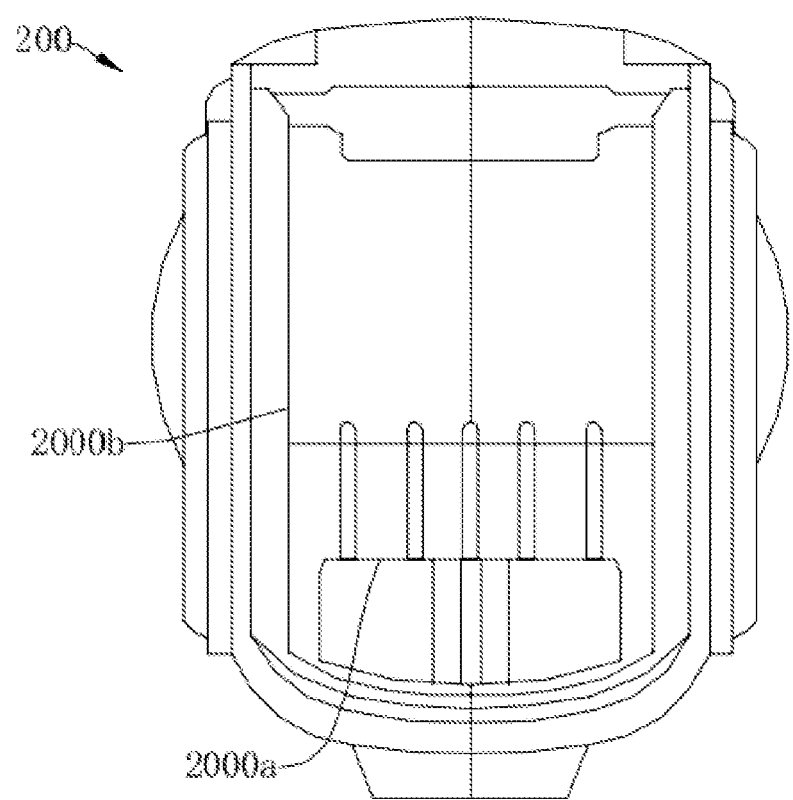
FIG. 3: A front view of the bottom of an electric tool of Embodiment 1 of the present invention.

Referring to FIG. 1, FIG. 2 and FIG. 3, the multi-purpose mobile power supply 100 includes: the first discharge interface 10 configured for powering a 3C electronic product; and the second discharge interface 20 configured for powering an electric tool.

When the second discharge interface 20 is installed and connected to the corresponding interface of the electric tool 200, the first discharge interface is at least partially covered by the electric tool 200.

The multi-purpose mobile power supply is configured for powering the 3C electronic products, and can be configured for powering the electric tools. Since powering the electric tools is generally in a complex environment, such as powering electric chain saws, where users should avoid using the multi-purpose mobile power supply for simultaneously powering the electric tools and the 3C electronic products, especially mobile phone and other communication equipment, which are often connected by data cables during powering. In this case, it is liable to cause operation accidents and cause unsafe use of the multi-purpose mobile power supply. Therefore, when the second discharge interface is installed and connected to the corresponding interface of the electric tool, the first discharge interface is at least partially covered by the electric tool, so that the first discharge interface for powering the 3C electronic products cannot be used normally, which effectively eliminates the operation situation of simultaneously powering the electric tools and the 3C electronic products by the multi-purpose mobile power supply, ensuring the safety of users.

It should be noted that: the electric tool 200 is not limited to cordless hand-held electric tools, but also includes gardening tools, cordless vacuum cleaners, direct current (DC) air compressors and other power operation equipment that use secondary batteries as power supplies. Specifically, in this embodiment, the cordless hand-held electric tool is taken as an example.

In order to ensure that when the second discharge interface 20 is installed and connected to the corresponding interface of the electric tool 200, the first discharge interface is at least partially covered by the electric tool 200. There are various implementation methods, such as arranging the first discharge interface 10 and the second discharge interface 20 on the same surface of the multi-purpose mobile power supply 100.

When the second discharge interface 20 is installed and connected to the corresponding interface of the electric tool 200, since the first discharge interface 10 and the second discharge interface 20 are located on the same surface, the first discharge interface 10 will be covered and blocked by the surface of the electric tool opposite to the surface of the multi-purpose mobile power supply.

At this time, the first discharge interface 10 can be completely covered and blocked, which ensures the powering safety, prevents external dust, litter, debris, and the like from entering the first discharge interface 10 when the multi-purpose mobile power supply supplies power to the electric tool, and plays a role in protecting the first discharge interface 10 so as to prolong the service life of the first discharge interface 10.

In addition, there are the following implementation methods:

Referring to FIG. 1 and FIG. 2, the first discharge interface 10 is arranged on the first side surface 100a of the multi-purpose mobile power supply 100, and the second discharge interface 20 is arranged on the second side surface 100b adjacent to the first side surface 100a; and the electric tool 200 is configured with a mounting portion corresponding to the second discharge interface 20, and the mounting portion is correspondingly provided with the connecting surface 2000a opposite to the second discharge interface 20 and a mounting side surface 2000b configured for at least partially covering the first discharge interface 10.

In this way, the mounting side surface 2000b of the mounting portion of the electric tool 200 functions to at least partially cover the mounting side surface 2000b of the first discharge interface 10. More preferably, the mounting side surface 2000b of the mounting portion of the electric tool 200 functions to completely cover the mounting side surface 2000b of the first discharge interface 10, which ensures the powering safety, prevents external dust, litter, debris, and the like from entering the first discharge interface 10 when the multi-purpose mobile power supply supplies power to the electric tool, and plays a role in protecting the first discharge interface 10 so as to prolong the service life of the first discharge interface 10.

More specifically, the multi-purpose mobile power supply 100 is substantially rectangular, and the first side surface 100a extends along the length direction of the multi-purpose mobile power supply 100; the second side surface 100b extends along the width direction of the multi-purpose mobile power supply 100.

In this way, when the users connect the multi-purpose mobile power supply 100 to the electric tool 200, the users can hold the multi-purpose mobile power supply 100 in the width direction and insert it along the length direction. Since the distance of the width direction is short, the users can conveniently hold the multi-purpose mobile power supply 100 during operation.

Additionally, the multi-purpose mobile power supply 100 is configured for a direct assembling and disassembling connection with the electric tool 200, and at least one surface of the multi-purpose mobile power supply 100 is in a latching connection with the corresponding surface of the electric tool 200.

The multi-purpose mobile power supply 100 and the electric tool 200 are subjected to the direct assembling and disassembling connection without other parts used for switching, such that the operation is quick and convenient.

The first discharge interface 10 is arranged on the surface of the multi-purpose mobile power supply 100 in the latching connection with the electric tool 200. In this way, the surface of the electric tool 200 corresponding to the latching connection can at least partially cover the first discharge interface 10.

Moreover, the first discharge interface 10 is preferably arranged above the latch structure 30 of the multi-purpose mobile power supply 100, so that the surface of the electric tool 200 corresponding to the latching connection will completely cover the first discharge interface 10, which ensures the powering safety, prevents external dust, litter, debris, and the like from entering the first discharge interface 10 when the multi-purpose mobile power supply supplies power to the electric tool, and plays a role in protecting the first discharge interface 10 so as to prolong the service life of the first discharge interface 10.

More specifically, the latch structure 30 includes the latch groove 30b provided on the surface of the multi-purpose mobile power supply for the latching connection with the corresponding surface of the electric tool 200; the electric tool 200 further includes at least one unlocking mechanism for manually disengaging a latch provided on the electric tool from the latch groove 30b.

Since the surface of the multi-purpose mobile power supply 100 is only provided with the latch groove, and the unlocking mechanism is arranged on the electric tool, there is no significant height difference on any surface of the multi-purpose mobile power supply 100, that is, there is no unlocking mechanism for manual operation on the battery pack of a traditional tool.

Furthermore, the latch structure 30 further includes the assembling and disassembling guide structure 30a, and the assembling and disassembling guide structure 30a linearly extends toward and is connected to the latch groove.

In addition, it should also be mentioned that the first discharge interface 10 includes the USB-A interface 10a and/or the USB-C interface 10b.

Through setting up the USB interface, the basic functions of the mobile power supply are satisfied; for example, during working in the field, when it is required to conduct telephone communication or network communication in a situation where the corresponding communication equipment is out of power, the communication equipment can be connected to the mobile power supply through the USB interface and the data cable to be charged, which is convenient for using the communication equipment. Specifically, the setting of the USB-C interface can further realize a bidirectional charging and discharging function. The setting of the USB-C interface makes the battery of the multi-purpose mobile power supply be charged by connecting the charger of the general mobile power supply to an external power supply without being equipped with a special charger, which is convenient for using and also saves the cost of additional configurations of the charger for the manufacturer.

Embodiment 2

Referring to FIGS. 4 to 8, the multi-purpose mobile power supply 100 includes the bottom surface 100d, the top surface 100c, two opposite first side surfaces 100a extending along the length direction 11 of the mobile power supply, two opposite second side surfaces 100b extending along the width direction 12, and further includes the first discharge interface 10 and the second discharge interface 20.

The first discharge interface 10 is configured for powering the 3C electronic products, such as computers, tablet computers, mobile phones or digital audio players.

The second discharge interface 20 is configured to supply power to the electric tool. In order to facilitate users to operate and connect the multi-purpose mobile power supply 100 to the electric tool 200, the second discharge interface 20 is arranged on any second side surface 100b. In addition, in order to rationally lay out the position of the discharge interface, the second discharge interface 20 and the first discharge interface 10 are located on different planes, and certainly, they can also be arranged on the same plane. The second discharge interface 20 includes the first terminal 20a, and the first terminal 20a is configured for press-fitting with the corresponding terminal of the electric tool 200 along the length direction 11. In this way, when the users connect the multi-purpose mobile power supply 100 to the electric tool 200, the users can hold the multi-purpose mobile power supply 100 in the width direction and insert it along the length direction. Since the distance of the width direction is short, the users can conveniently hold, use and operate the multi-purpose mobile power supply.

It should be noted that the electric tool 200 is not limited to cordless hand-held electric tools, but also includes gardening tools, cordless vacuum cleaners, DC air compressors and other power operation equipment that use secondary batteries as power supplies. Specifically, in this embodiment, the cordless hand-held electric tool is taken as an example.

Additionally, in order to facilitate the installation and arrangement of the second discharge interface 20, the first terminal 20a extends along the length direction and is parallel to the built-in circuit board 300 of the multi-purpose mobile power supply 100.

Figure 4:
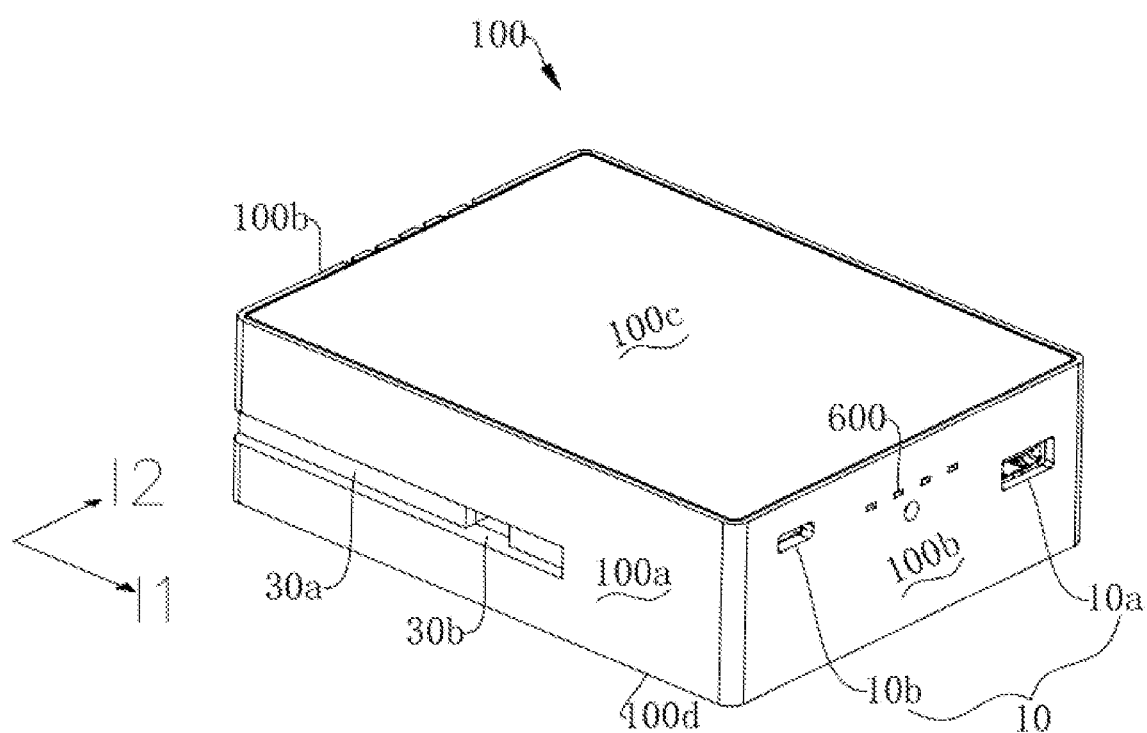
FIG. 4: A first structural schematic diagram of Embodiment 2 of the present invention.
Figure 5:
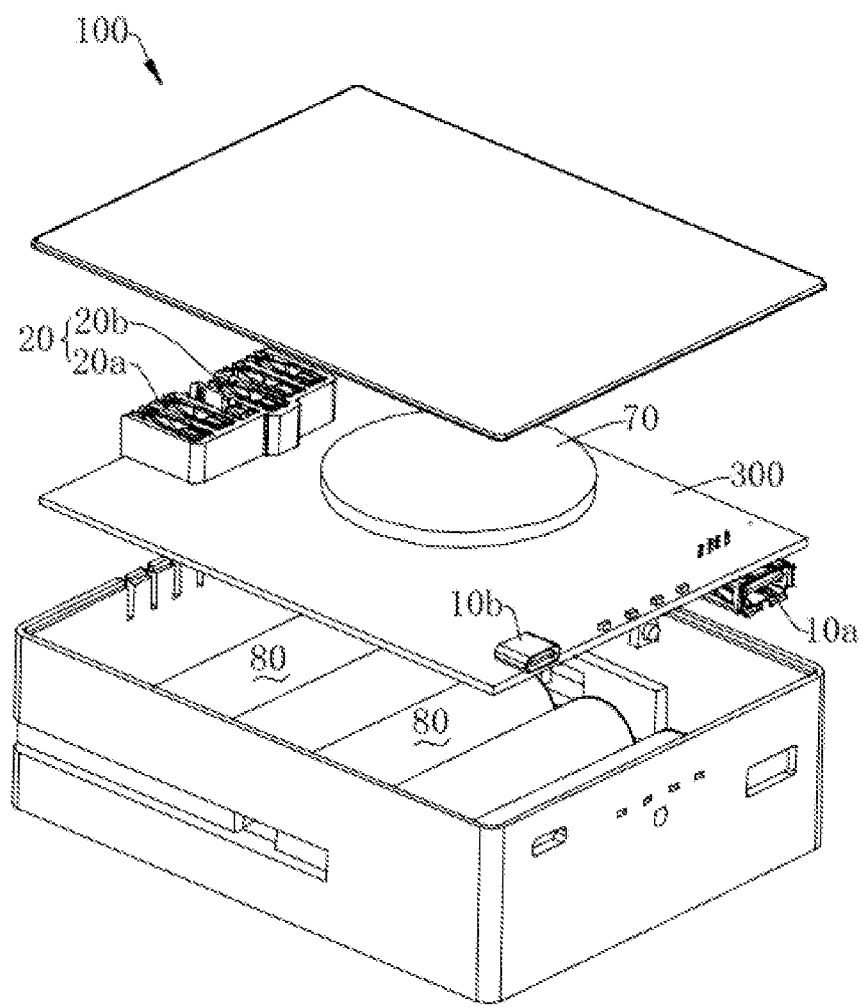
FIG. 5: An exploded schematic diagram of FIG. 4 of Embodiment 2 of the present invention.
Figure 6:
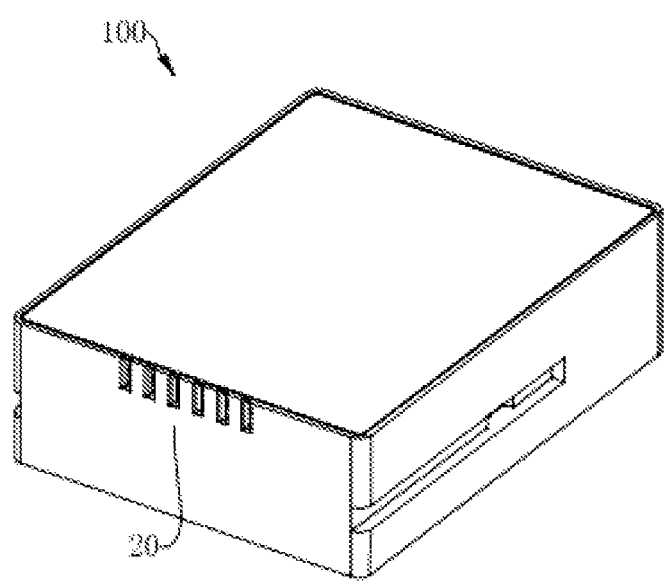
FIG. 6: A second structural schematic diagram of Embodiment 2 of the present invention.
Figure 7:
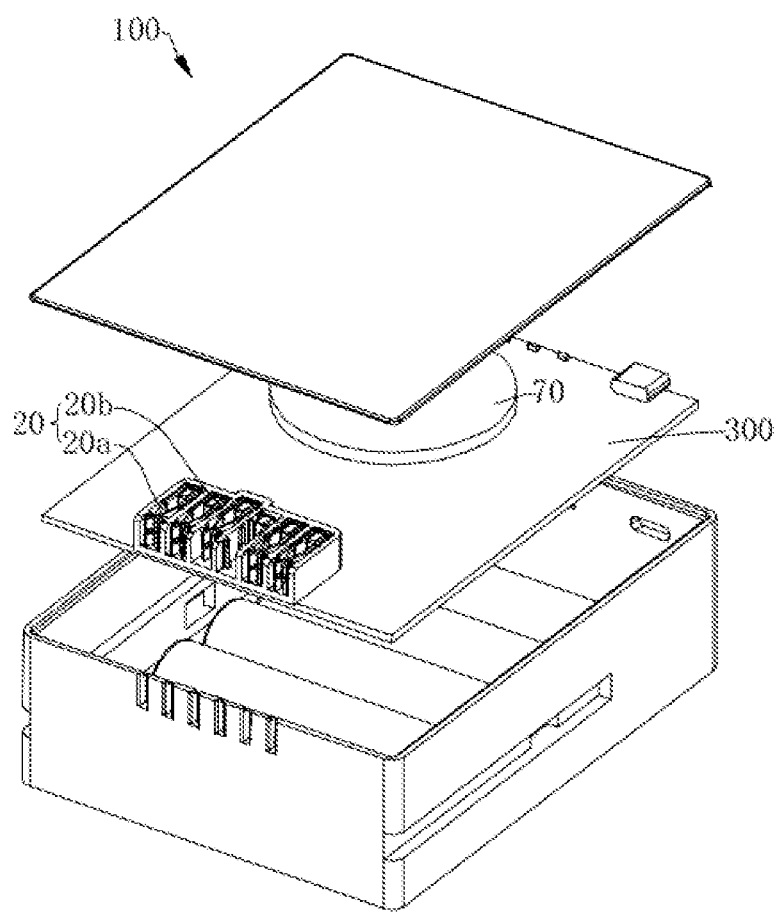
FIG. 7: An exploded schematic diagram of FIG. 6 of Embodiment 2 of the present invention.
Figure 8:
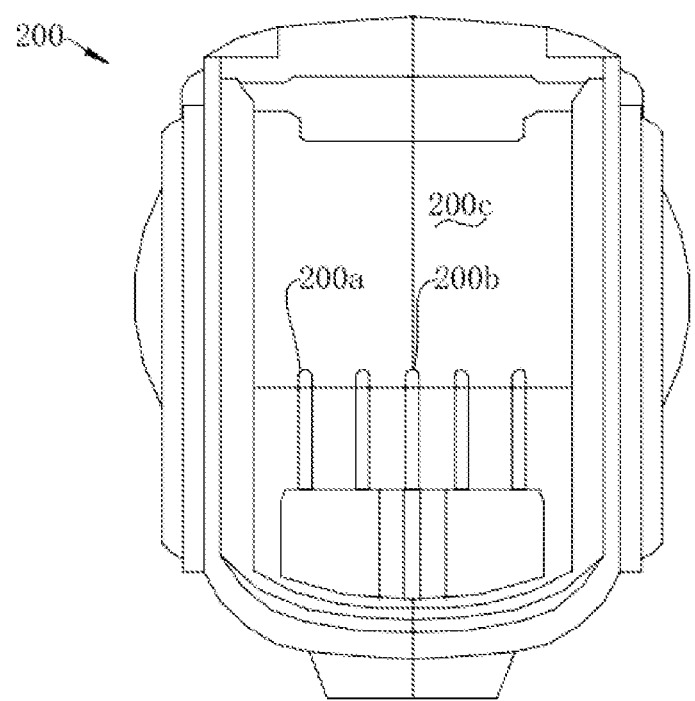
FIG. 8: A front view of the bottom of an electric tool of Embodiment 2 of the present invention.

Referring to FIG. 4 and FIG. 5, in order to rationally lay out the position of the discharge interfaces, the first discharge interface 10 is arranged on the arrangement plane opposite to the arrangement plane of the second discharge interface 20, that is, on another plane opposite to the second side surface 100b, that is, on another second side surface 100b, such that based on the design, the arrangement of side interfaces is less crowded and dense, which is more convenient for users to operate and use the discharge interfaces.

The power display lamp 600 or a display screen configured for power display is further provided on the arrangement plane of the first discharge interface 10.

The built-in controller of the mobile power supply can detect the battery power in real time, and then control the power display lamp 600 or the display screen configured for power display to display the current power. The power display lamp 600 can be multiple LED lights. The controller can display the power by controlling the number of LED lights to be lit. Certainly, it can also be the display screen, where the controller controls the display of the percentage of power to realize the display of the battery pack power.

In addition, the multi-purpose mobile power supply 100 is configured for the direct assembling and disassembling connection with the electric tool 200, and at least one surface of the multi-purpose mobile power supply 100 is in a latching connection with the corresponding surface of the electric tool 200, so as to directly meet powering the electric tool without other switching structure, which makes the operation and use be simple and convenient, and connects the powering of electric tools with the powering of 3C electronic products, achieving the powering in two different fields across borders.

Specifically, the two opposite first side surfaces 100a are respectively provided with a latch groove 30b for the latching connection with the corresponding surface of the electric tool 200. The surface of the multi-purpose mobile power supply 100 adapted to the electric tool 200 for the latching connection is as basically flat as the surface of the housing body of the multi-purpose mobile power supply 100; for example, the distance between the surface of the latch groove 30b for the latching connection and the surface of the housing body of the multi-purpose mobile power supply 100 is not more than 2.5 mm, for instance, it can be set to 2 mm, 1.5 mm, or 1 mm.

In order to facilitate the assembling and disassembling of the mobile power supply, the first side surfaces 100a are respectively provided with the assembling and disassembling guide structure 30a, and the assembling and disassembling guide structure 30a linearly extends along the length direction 11 to be connected to the latch groove 30b.

The first discharge interface 10 at least includes the USB-A interface 10a and/or the USB-C interface 10b, which is connected to the built-in circuit board 300 of the multi-purpose mobile power supply 100.

Through setting up the USB interface, the basic functions of the mobile power supply are satisfied; for example, during working in the field, when it is required to conduct telephone communication or network communication in a situation where the corresponding communication equipment is out of power, the communication equipment can be connected to the mobile power supply through the USB interface and the data cable to be charged, which is convenient for using the communication equipment. Specifically, the setting of the USB-C interface can further realize a bidirectional charging and discharging function. The setting of the USB-C interface makes the battery of the multi-purpose mobile power supply be charged by connecting the charger of the general mobile power supply to an external power supply without being equipped with a special charger, which is convenient for using and also saves the cost of additional configuration of the charger for manufacturer.

Moreover, the USB-C interface 10b is configured for automatically identifying whether the connected external device is a charging device or a smart terminal. When the external device is the charging device, the mobile power supply is charged through the charging device. When the external device is the smart terminal, the smart terminal is charged or configured to charge the mobile power supply.

In addition, the mobile power supply further includes the wireless charging receiving module, which is configured to adapt to a standard wireless charging transmitting module for wireless charging, and the electromagnetic coil of the wireless charging receiving module and the built-in circuit board of the mobile power supply are arranged in parallel.

When wireless charging is required, the controller controls the wireless charging receiving module 60A to work, and then charge the battery. The wireless charging receiving module 60A further expands the charging method of the mobile power supply, and reduces the restriction on the charging environment of the mobile power supply.

Embodiment 3

Referring to FIGS. 1 to 8, the multi-purpose mobile power supply 100 includes: the first discharge interface 10 configured for powering a 3C electronic product; the second discharge interface 20 configured for powering the electric tool 200; and at least one latch groove 30b, which is arranged on the surface of the housing body of the multi-purpose mobile power supply 100, and is configured for the latching connection with the electric tool 200.

The surface of the housing body where the latch groove 30b is arranged or the surface adjacent thereto has no protrusion.

The mobile power supply can meet powering the 3C products, and adapt to the electric tools for powering, and the structure layout is reasonable. When the surface of the housing body of the mobile power supply is arranged with the latch groove, the traditional battery pack used in matching electric tools generally has the protuberant latch, and the unlocking mechanism linked with the latch for user operation, causing the battery pack to have a complex structure layout and a large structure size, and be inconvenient to carry and use as a mobile power supply. Therefore, in the mobile power supply provided by the present invention, a conventional latch is set as a latch groove, and the traditional unlocking mechanism is omitted, so that the surface of the housing body where the latch groove is arranged or the surface adjacent thereto has no protrusion.

Embodiment 4

Referring to FIG. 9 to FIG. 12, the multi-purpose mobile power supply 100 includes the bidirectional charging and discharging interface 10A and a tool power supply interface 20A, that is, the second discharge interface 20.

The bidirectional charging and discharging interface 10A is configured for charging or discharging the 3C electronic products, such as computers, tablet computers, mobile phones or digital audio players. The bidirectional charging and discharging interface 10A is connected to the built-in bidirectional charging and discharging circuit 30A of the multi-purpose mobile power supply 100.

The bidirectional charging and discharging interface 10A is not only configured to supply power to the 3C electronic products, but also can charge itself through the 3C electronic products, which facilitates the use of the multi-purpose mobile power supply and reduces the restrictions on the charging methods of the multi-purpose mobile power supply.

The second discharge interface 20 is configured for powering the electric tool 200, and includes the first terminal 20a. The first terminal 20a is configured for press-fitting with the corresponding terminal of the electric tool 200.

It should be noted that: the electric tool 200 is not limited to cordless hand-held electric tools, but also includes gardening tools, cordless vacuum cleaners, DC air compressors and other power operation equipment that use secondary batteries as power supplies. Specifically, in this embodiment, the cordless hand-held electric tool is taken as an example.

When the first terminal 20a is press-fitted with the corresponding terminal of the electric tool 200, the surface of the multi-purpose mobile power supply 100 is in contact with the electric tool 200, and at least one surface is in a latching connection with the corresponding surface of the electric tool 200.

The multi-purpose mobile power supply 100 is improved in aspects of the single charging and discharging interface and the single function of the traditional mobile power supply, and the multi-purpose mobile power supply 100 can also be in a direct latching connection with the electric tool 200 to directly meet powering the electric tool 200, and make the operation and use be simple and convenient. Therefore, the multi-purpose mobile power supply connects the powering of the electric tools with the powering of the 3C electronic products, achieving the powering in two different fields across borders.

Figure 9:
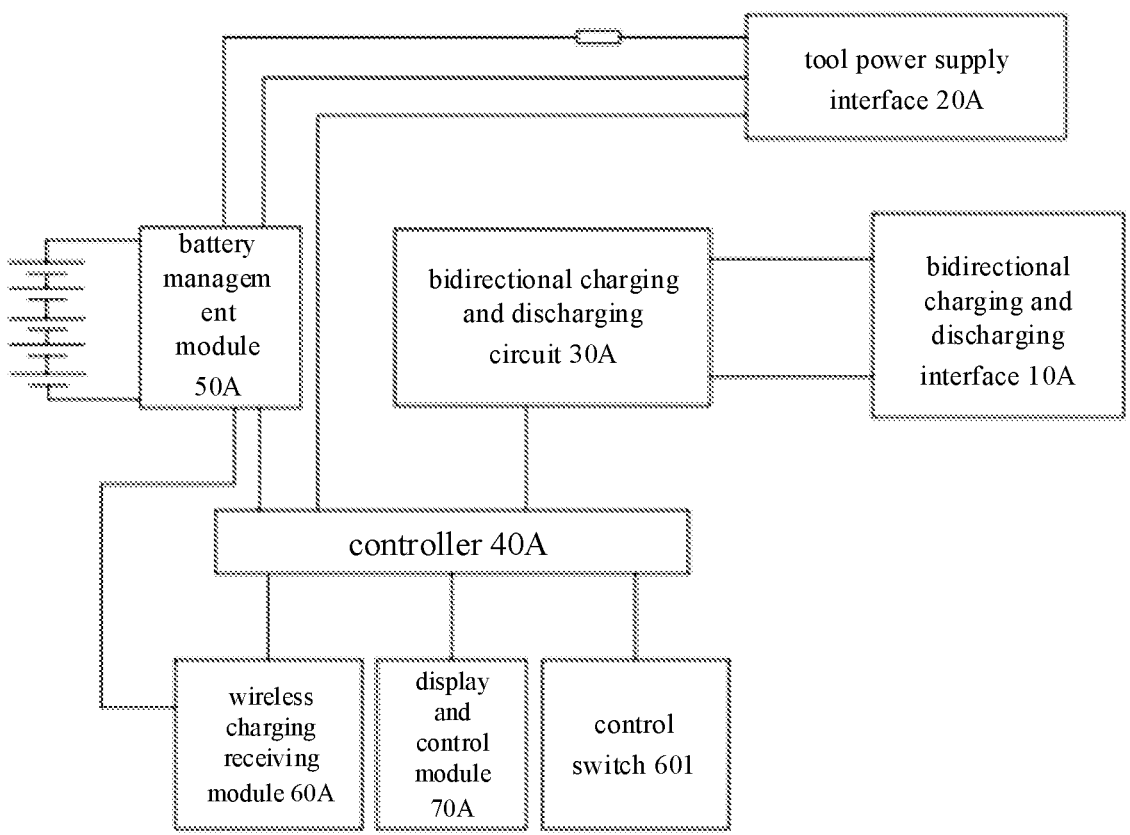
FIG. 9: A schematic block diagram showing a structural principle of Embodiment 4 of the present invention.
Figure 10:
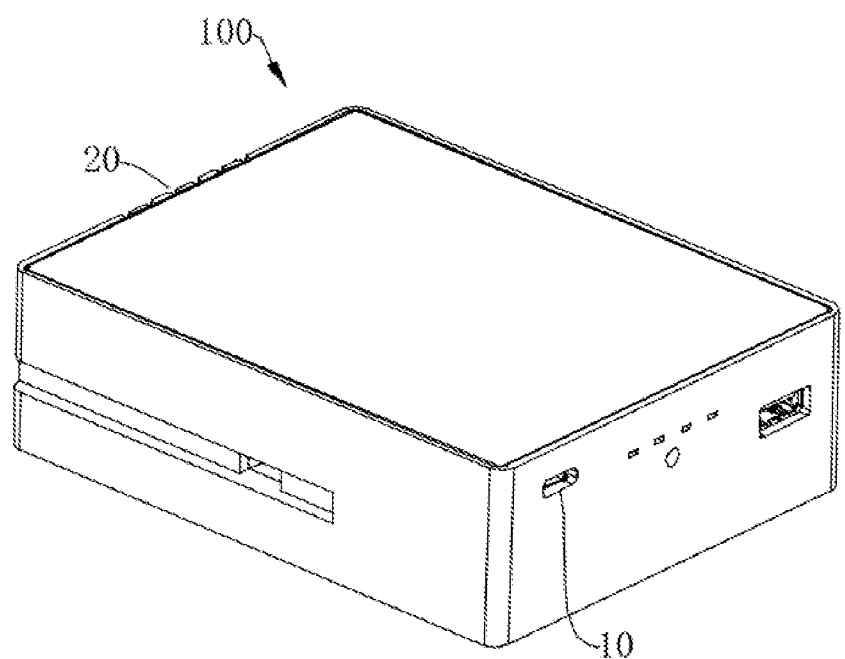
FIG. 10: A structural schematic diagram of Embodiment 4 of the present invention.

As shown in FIG. 9, the multi-purpose mobile power supply 100 further includes the control switch 601 which is electrically connected to the bidirectional charging and discharging circuit 30A to control the charging or discharging of the bidirectional charging and discharging interface 10A.

Specifically, the control switch 601 is electrically connected to the bidirectional charging and discharging circuit 30A through the controller 40A to control the charging or discharging of the bidirectional charging and discharging interface 10A.

More specifically, the control switch 601 includes a discharge-starting switch and a charge-starting switch. When it is required to charge the connected external device, the discharge-starting switch is selected to charge the external device, and when it is required to charge the battery pack itself, the charge-starting switch is selected, and the battery pack is charged by the external device.

In addition, in order to more conveniently and intelligently realize the charging or discharging control of the multi-purpose mobile power supply 100, the bidirectional charging and discharging interface 10A can also be configured to automatically recognize whether the external device is a charging power supply or a device that needs to be charged, and automatically switch the charging or discharging state.

The bidirectional charging and discharging interface 10A can automatically identify the connected external device, and then automatically identify whether the bidirectional charging and discharging interface 10A is connected to the charging power supply or the device that needs to be charged, so as to control the battery pack to automatically switch between the charging and discharging states, which is convenient for operation and use. In addition, when the voltage of the connected external device is higher than the voltage of the multi-purpose mobile power supply 100, the connected external device can also be configured as the charging power supply to charge the multi-purpose mobile power supply 100 through the bidirectional charging and discharging interface 10A.

Additionally, the multi-purpose mobile power supply 100 may further include the display and control module 70A. The display and control module 70A is electrically connected to the bidirectional charging and discharging circuit 30A, and is configured for controlling the charging or discharging of the bidirectional charging and discharging interface 10A according to user operation instructions.

Specifically, the display and control module 70A is electrically connected to the bidirectional charging and discharging circuit 30A through the controller 40A. For example, the display and control module 70A is provided with a touch switch, and the touch switch is configured for controlling the charging or discharging of the bidirectional charging and discharging interface 10A according to the user operation instructions.

In addition, the multi-purpose mobile power supply 100 further includes the battery management module 50A. The battery management module 50A is electrically connected to the built-in battery unit 80 and is electrically connected to the display and control module 70A through the controller 40A. The battery management module 50A is configured for monitoring the battery status and/or battery capacity of the battery unit and sending the detected battery status and/or battery capacity to the display and control module 70A.

The controller 40A can control the display screen of the display and control module 70A to display the battery working status information, such as charging voltage and charging current, discharging voltage and discharging current, battery temperature, and the like.

In addition, the maximum output power of the bidirectional charging and discharging interface 10A is ≤100 W, and the voltage output range is 5-20 V, to meet the charging and discharging requirements of the 3C products such as the mobile phones, laptops and the like.

Moreover, in order to facilitate users to carry and use by air, the maximum capacity of the multi-purpose mobile power supply 100 is ≤160 WH.

Figure 11:
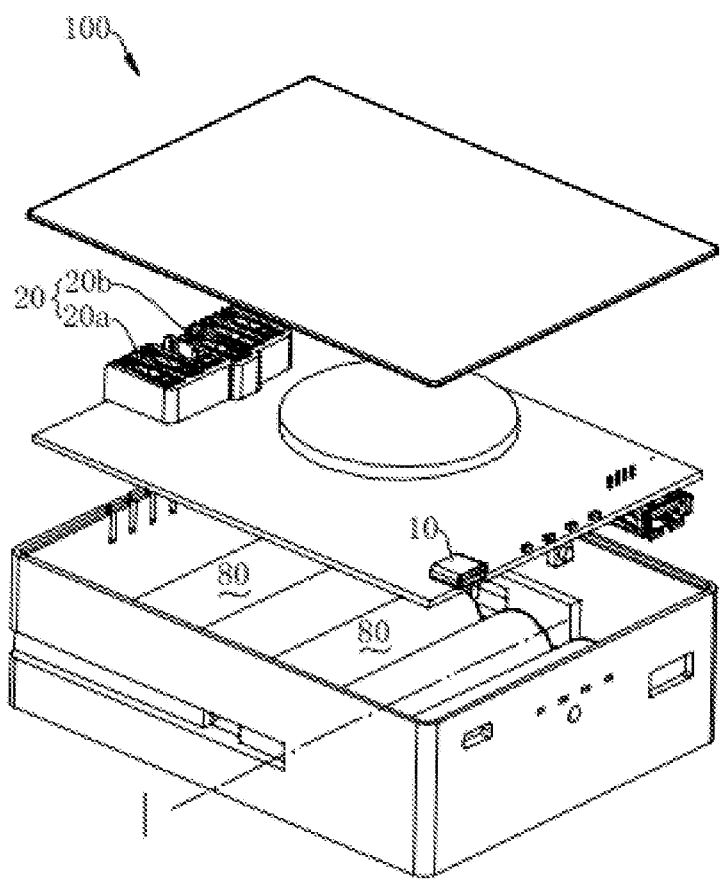
FIG. 11: An exploded schematic diagram of FIG. 10 of Embodiment 4 of the present invention.
Figure 12:
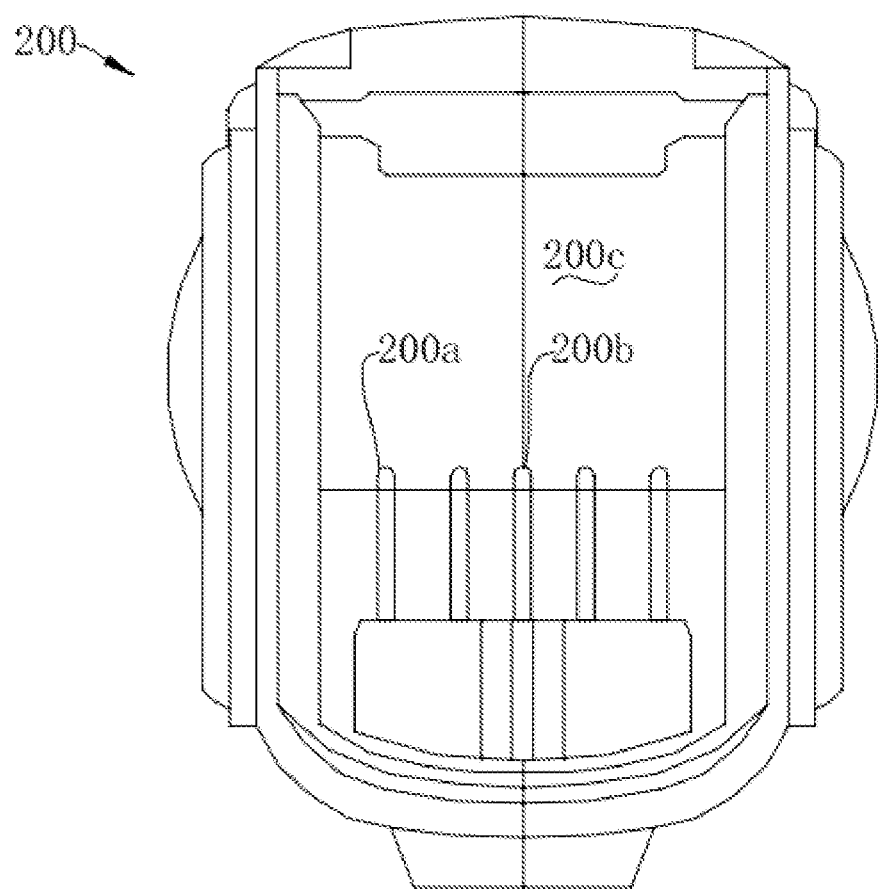
FIG. 12: A front view of the bottom of an electric tool of Embodiment 4 of the present invention.

In addition, referring to FIG. 11 and FIG. 12, an assembly of the multi-purpose mobile power supply and the electric tool includes: the multi-purpose mobile power supply 100 described above; and the electric tool 200, including: a motor; the mounting portion 200c configured for the freely assembling and disassembling connection with the multi-purpose mobile power supply 100; the power supply terminal 200a arranged on the mounting portion 200c and electrically connected to the motor, where the power supply terminal 200a is configured for being combined with the first terminal 20a; a latch arranged on the mounting portion 200c, where the multi-purpose mobile power supply 100 is provided with a latch groove corresponding to the latch, and the latch is fitted in the latch groove in the latching connection; and at least one unlocking mechanism configured to manually disengage the latch from the latch groove.

Further, the tool power supply interface 20A includes at least one second terminal 20b, and the second terminal 20b is configured for transmitting a control signal for controlling the charging and/or discharging of the built-in battery unit 80.

The electric tool 200 includes the signal terminal 200b, the signal terminal 200b is arranged on the mounting portion 200c and can be combined with the second terminal 20b. Since the first terminal 20a is configured for circuit conduction, the passing current is relatively large, needing to be tightly and fully contacted, while the second terminal 20b is configured for signal transmission, the passing current is singularly small, and the contact is sufficient. Therefore, the fitting pressure of the second terminal 20b and the signal terminal 200b is less than the fitting pressure of the first terminal 20a and the power supply terminal 200a.

Moreover, when power-on insertion is conducted, in order to let the circuit on the first terminal 20a work first, and then to identify the communication through the second terminal 20b, so as to allow the signal interface of the second terminal 20b to better identify, the distance between the opening end portion of the second terminal 20b and the corresponding opening of the surface of the power supply is greater than the distance between the opening end portion of the first terminal 20a and the corresponding opening of the surface of the power supply.

Finally, it should be noted that the above embodiments are only configured to illustrate the technical solutions of the present invention, not to limit the present invention; although the present invention has been described in detail with reference to the above embodiments, those ordinary skilled in the art should understand that: the technical solutions recorded in the above embodiments can be modified, or some or all of the technical features can be equivalently replaced; these modifications or replacements do not cause the essence of the corresponding technical solutions to deviate from the scope of the technical solutions of the embodiments of the present invention.

What is claimed is:

1. A multi-purpose mobile power supply, comprising:
   a first discharge interface configured to power a computer, communication and consumer (3C) electronic product; and
   a second discharge interface configured to power an electric tool;
   a slide groove; and
   a latch groove, which is configured to receive a latch of the electric tool and is distinct from the slide groove, wherein when the second discharge interface is directly installed and connected to a corresponding interface of the electric tool, the first discharge interface is at least partially covered by the electric tool, and at least part of a surface of the multi-purpose mobile power supply is externally exposed, and wherein the slide groove, the latch groove and the first discharge interface are disposed on a same lateral surface of the multi-purpose mobile power supply.

2. The multi-purpose mobile power supply according to claim 1, wherein the multi-purpose mobile power supply is configured for a direct assembling and disassembling connection with the electric tool.

3. The multi-purpose mobile power supply according to claim 1, wherein the first discharge interface and the second discharge interface are arranged on a same surface of the multi-purpose mobile power supply.

4. The multi-purpose mobile power supply according to claim 1, wherein the first discharge interface is arranged on a first side surface of the multi-purpose mobile power supply, and the second discharge interface is arranged on a second side surface adjacent to the first side surface; and the electric tool is configured with a mounting portion corresponding to the second discharge interface, and the mounting portion is correspondingly provided with a connecting surface opposite to the second discharge interface, and a mounting side surface configured to at least partially cover the first discharge interface.

5. A multi-purpose mobile power supply, comprising a bottom surface, a top surface, two opposite first side surfaces extending along a length direction of the multi-purpose mobile power supply, and two opposite second side surfaces extending along a width direction of the multi-purpose mobile power supply, further comprising:

a first discharge interface configured to power a 3C electronic product;

a second discharge interface arranged on any one of the two opposite second side surfaces;

a slide groove; and a latch groove, wherein the latch groove is configured to receive a latch of an electric tool to implement a latching connection with the electric tool, and is distinct from the slide groove, and wherein the slide groove, the latch groove and the first discharge interface are disposed on a same lateral surface of the multi-purpose mobile power supply, and wherein the second discharge interface at least comprises a first terminal, and the first terminal is configured for direct press-fitting with a corresponding terminal of the electric tool along the length direction.

6. The multi-purpose mobile power supply according to claim 5, wherein when the multi-purpose mobile power supply is directly connected to the electric tool, at least part of a surface of the multi-purpose mobile power supply is externally exposed.

7. The multi-purpose mobile power supply according to claim 5, wherein a surface of the multi-purpose mobile power supply adapted to the electric tool for the latching connection is as flat as a surface of a housing body of the multi-purpose mobile power supply.

8. The multi-purpose mobile power supply according to claim 5, wherein when the first terminal is connected to the corresponding terminal of the electric tool, the first discharge interface is at least partially covered by the electric tool.

9. A multi-purpose mobile power supply, comprising:

a first discharge interface configured to power a 3C electronic product;

a second discharge interface configured to power an electric tool;

a slide groove;

at least one latch groove configured to receive a latch of the electric tool to implement a latching connection with the electric tool, wherein the slide groove, the first discharge interface and the at least one latch groove are arranged on a same lateral surface of a housing body of the multi-purpose mobile power supply and the at least one latch groove is distinct from the slide groove;

wherein the surface of the housing body where the at least one latch groove is arranged or a surface adjacent to the surface of the housing body where the at least one latch groove is arranged has no protrusion.

10. The multi-purpose mobile power supply according to claim 9, wherein the second discharge interface at least comprises a first terminal, and the first terminal is configured for direct press-fitting with a corresponding terminal of the electric tool; and when the first terminal is connected to the corresponding terminal of the electric tool, the first discharge interface is at least partially covered by the electric tool.

11. The multi-purpose mobile power supply according to claim 9, wherein when the multi-purpose mobile power supply is in the latching connection with the electric tool, at least part of a surface of the multi-purpose mobile power supply is externally exposed.

12. A multi-purpose mobile power supply, comprising:

a bidirectional charging and discharging interface, wherein the bidirectional charging and discharging interface is configured to charge or discharge a 3C electronic product, and the bidirectional charging and discharging interface is connected to a built-in bidirectional charging and discharging circuit of the multi-purpose mobile power supply;

a second discharge interface, wherein the second discharge interface is configured to power an electric tool, and comprises a first terminal, and the first terminal is configured to press-fit with a corresponding terminal of the electric tool;

a slide groove; and a latch groove configured to receive a latch of the electric tool to implement a latching connection with the electric tool, wherein the slide groove, the latch groove and the bidirectional charging and discharging interface are disposed on a same lateral surface of the multi-purpose mobile power supply and the latch groove is distinct from the slide groove, and wherein when the first terminal is press-fitted with the corresponding terminal of the electric tool, a surface of the multi-purpose mobile power supply is in contact with the electric tool.

13. The multi-purpose mobile power supply according to claim 12, wherein the bidirectional charging and discharging interface is configured to automatically recognize whether an external device is a charging power supply or a device that needs to be charged, and automatically switch a charging or discharging state.

14. The multi-purpose mobile power supply according to claim 12, wherein when the first terminal is connected to the corresponding terminal of the electric tool, the first discharge interface is at least partially covered by the electric tool.

15. The multi-purpose mobile power supply according to claim 12, wherein when the multi-purpose mobile power supply is directly connected to the electric tool, at least part of the surface of the multi-purpose mobile power supply is externally exposed.

16. An assembly of a multi-purpose mobile power supply and an electric tool, comprising:

the multi-purpose mobile power supply, comprising a first discharge interface configured to power a 3C electronic product, a second discharge interface configured to power the electric tool, a slide groove and a latch groove, wherein the slide groove, the latch groove and the first discharge interface are disposed on a same lateral surface of the multi-purpose mobile power supply and the latch groove is distinct from the slide groove; and the electric tool, comprising:

a motor;

a mounting portion configured for a freely assembling and disassembling connection with the multi-purpose mobile power supply;

a power supply terminal, wherein the power supply terminal is arranged on the mounting portion and the power supply terminal is electrically connected to the motor, and the power supply terminal is configured to be combined with the second discharge interface;

a latch arranged on the mounting portion, wherein the latch is fitted in the latch groove in a latching connection; and at least one unlocking mechanism configured to manually disengage the latch from the latch groove.

17. The assembly of the multi-purpose mobile power supply and the electric tool according to claim 16, wherein the second discharge interface at least comprises a first terminal; and when the first terminal is connected to the power supply terminal, the first discharge interface is at least partially covered by the electric tool.

18. The assembly of the multi-purpose mobile power supply and the electric tool according to claim 16, wherein when the multi-purpose mobile power supply is in the latching connection with the mounting portion of the electric tool, and at least part of a surface of the multi-purpose mobile power supply is externally exposed.

19. The assembly of the multi-purpose mobile power supply and the electric tool according to claim 16, wherein the mounting portion has an open port; and when viewed in a direction perpendicular to a plane of the mounting portion, the power supply terminal is visible by a user.

\* \* \* \* \*